(12) United States Patent
Frentz et al.

(10) Patent No.: US 7,011,186 B2
(45) Date of Patent: Mar. 14, 2006

(54) METHOD FOR DETERMINING A BRAKE STATE

(75) Inventors: Georg Frentz, Nuertingen (DE); Matthias Leber, Stuttgart (DE)

(73) Assignee: DaimlerChrysler AG, Stuttgart (DE)

(*) Notice: Subject to any disclaimer, the term of this patent is extended or adjusted under 35 U.S.C. 154(b) by 0 days.

(21) Appl. No.: 10/738,134

(22) Filed: Dec. 18, 2003

(65) Prior Publication Data

US 2004/0195050 A1 Oct. 7, 2004

(30) Foreign Application Priority Data

Dec. 19, 2002 (DE) .................. 102 59 529

(51) Int. Cl.
*F16D 66/00* (2006.01)

(52) U.S. Cl. .................. 188/1.11 L; 188/1.11 E

(58) Field of Classification Search .......... 188/1.11 L, 188/1.11 E; 116/208; 340/454; 303/3, 303/15, 20
See application file for complete search history.

(56) References Cited

U.S. PATENT DOCUMENTS

| | | | |
|---|---|---|---|
| 5,588,716 A * | 12/1996 | Stumpe | .......... 303/7 |
| 5,651,431 A | 7/1997 | Kyrtsos | |
| 5,668,529 A | 9/1997 | Kyrtsos | |
| 5,939,978 A | 8/1999 | Kyrtsos | |
| 6,250,436 B1 * | 6/2001 | Oikawa et al. | ........... 188/72.1 |
| 6,260,665 B1 | 7/2001 | Kramer et al. | |
| 6,299,261 B1 * | 10/2001 | Weiberle et al. | ........... 303/20 |
| 6,665,502 B1 | 12/2003 | Sokoll et al. | |
| 2002/0104717 A1 * | 8/2002 | Borugian | ........... 188/1.11 E |

FOREIGN PATENT DOCUMENTS

| | | |
|---|---|---|
| DE | 3502052 | 7/1986 |
| DE | 3640888 | 6/1988 |
| DE | 4024771 | 2/1992 |
| DE | 4139546 | 6/1993 |
| DE | 4316993 | 11/1994 |
| DE | 4319996 | 12/1994 |
| DE | 10029238 | 12/2001 |
| WO | WO92/14075 | 8/1992 |
| WO | WO 99/57451 | 11/1999 |

* cited by examiner

*Primary Examiner*—Chris Schwartz
(74) *Attorney, Agent, or Firm*—Crowell & Moring LLP

(57) ABSTRACT

In a method for determining the state of a motor vehicle brake, particularly the brake-lining state or the brake-lining thickness, a temperature sensor is arranged in the brake lining of the motor vehicle brake, and the temperature detected by the sensor is used to determine the brake state. In addition to a first temperature value, at least one second temperature value detected after the first temperature value and the time duration between the detection time points of the two temperature values are employed. The brake state is determined based on an evaluation of a time profile of temperature values sensed by said sensor.

9 Claims, 2 Drawing Sheets

METHOD FOR DETERMINING A BRAKE STATE

BACKGROUND AND SUMMARY OF THE INVENTION

This application claims the priority of German patent document 102 59 529.1, filed 19 Dec. 2003, the disclosure of which is expressly incorporated by reference herein.

The invention relates to a method for determining the operational status of a vehicle brake.

German patent document DE 36 40 888 A1 discloses a monitoring device for detecting brake-lining wear, and in particular for determining the remaining brake-lining thickness. For this purpose, the brake lining has a sensor in the form of an electric conductor. When, due to its use, the brake lining is abraded as far as the sensor, the state of wear of the brake lining is detected by means of the sensor and is indicated by means of an indicator device. Such monitoring devices and other similar ones are also used in vehicles.

German patent document DE 43 16 993 A1 discloses a method for determining a remaining brake-lining thickness, in which the abrasion on a brake lining is determined by means of a wear model. Frictional work performed during a braking operation is incorporated into the wear model. The abrasion determined in the brake lining is subtracted from the initial lining thickness, so that the remaining brake-lining thickness is obtained.

In International patent document WO 92/14075 the temperature of the brake disc is determined in order to indicate the brake state. It is mentioned that a reference to the lining wear could possibly also be made by means of a temperature measurement, although this is not dealt with in any more detail.

German patent document DE 100 29 238 A1 discloses a method for monitoring the remaining lining thickness of a brake lining, in which the brake pressure, the wheel speed and the brake temperature are incorporated into a wear model. By means of these three input variables, when such a braking operation takes place the lining wear occurring during the braking operation is determined individually for each wheel. Thus, the remaining brake-lining thickness can be calculated for each wheel from the remaining brake-lining thickness prior to the braking operation and from the lining wear due to the braking operation.

One object of the invention is to provide an improved method for determining the wear state of vehicle brakes.

Another object of the invention is to provide a method which determines brake-lining wear more reliably and more accurately.

These and other objects and advantages are achieved by the method according to the invention, in which the wear status of a motor vehicle brake (particularly a disc brake) is determined by means of a temperature sensor arranged in or on a brake lining. According to the invention, an evaluation of the time profile of the temperature is carried out. That is, in addition to a first measured temperature value, at least one second temperature value is detected after the first temperature value, and the time duration between the detection time points of the two temperature values is measured. More particularly, a plurality or a large number of temperature values and the associated time points or the time durations between the detection of the individual temperature values may be employed.

As an alternative to measuring a large number of discrete temperature values and time points or time durations, it is also possible to employ the temperature profile as a continuous function of time in order to determine the brake state. In this alternative, once again, at least two temperature values and the time duration lying between the detection of these two temperature values or the time points belonging to these two temperature values are employed. The advantage of the method according to the invention is that the brake state can be determined particularly reliably and accurately, because the time profile of the temperature (that is, the temperature change as a function of time) in the brake lining, is closely related to the brake state, and in particular to the brake-lining thickness.

In an advantageous refinement of the method, the brake state is determined solely by means of the detected temperature values and the associated times. That is, it is possible to determine the brake state very quickly and in a very simple way, without using any further parameters.

In a preferred embodiment of the invention, the brake state determined is the lining thickness, which is determined, not by means of a wear model using a previously determined brake-lining thickness, but simply by means of parameters detected at close time intervals. This is particularly advantageous, because, in contrast to a determination by means of a wear model, no error accumulation takes place. It is also possible, however, to use the result of the determination according to the invention of the brake-lining thickness in order to supplement, correct and/or improve a wear model. In a determination of the brake state and, in particular, of the brake-lining thickness by means of various methods, the reliability can be further increased.

Alternatively to determining the lining thickness, other brake states which may be determined are, for example, the surface quality of a brake lining, the surface quality of the brake disc, the clearance between the brake lining and the brake disc in the nonoperative position of the brake, or contamination, fatigue or damage of a brake component.

In one embodiment of the method according to the invention, a first temperature value is detected at or very near the commencement of a braking operation, so that it corresponds to an initial temperature during the braking operation. A second temperature value is detected during or after the braking operation. If this second temperature value is above the first temperature value by the amount of a predeterminable threshold value, the brake state is determined and, for this purpose, the time duration between the detection of the first and the second temperature value is employed.

This time duration corresponds to a propagation time, characteristic of the brake state (particularly the remaining brake-lining thickness), of heat generated as a result of the friction between brake disc and brake lining, through the brake lining as far as the temperature sensor. The threshold value for the temperature difference between the first and the second temperature value is preferably selected such that it is indicative of a temperature rise in the surroundings of the temperature sensor which is caused by the braking. The stipulation of the threshold value assures that a determination of the brake state takes place only when it can be made reliably by means of the detected parameters (for example because braking which is necessarily long and/or necessarily pronounced for this purpose has occurred). An evaluation based on two temperature values and on the time duration lying between these times assigned to the two temperature values can be carried out in a particularly simple way.

As a precondition for carrying out or continuing the method for determining the brake state, further necessary conditions may be stipulated, for example conditions with regard to the initial temperature of the brake lining, the outside temperature or the vehicle speed.

In another embodiment of the invention, a temperature gradient (rising or falling) associated with a braking operation is determined by means of at least two temperature values. For this purpose, the temperature gradient is determined from at least one first temperature value, one second temperature value and the time duration between the detection of the two temperature values. This temperature gradient is employed in order to determine the brake state. The determination of the temperature gradient may also be carried out by means of a large number of temperature values or by means of a curve segment of a detected temperature curve comprising a plurality of temperature values. A plurality of temperature gradients may be determined and be employed individually, weighted or averaged, in order to determine the brake state.

In an embodiment of the method according to the invention which can be carried out in a simple way, only one or more temperature gradients are used.

Alternatively, during a braking operation, the initial and the final temperature are detected at the temperature sensor and are used in order to determine the brake state. Additionally or alternatively, drive-dynamic variables may also be employed to determine the brake state, so as to increase further the reliability and accuracy of the method.

In still another embodiment of the method according to the invention, a brake-state determination braking is initiated by a control unit at predeterminable time points or intervals. Such a brake-state determination braking may be initiated, for example, following a predeterminable time duration after the start of a trip and/or at predeterminable time intervals. During a brake-state determination braking, the vehicle is braked in a way which cannot be perceived, or at least can be perceived only slightly by the vehicle occupants. That is, braking is executed with only slight deceleration (for example 1% of the maximum), and/or it is compensated completely or partially via a drive-train and engine control. The braking action or the heat generation approximately to be expected may in this case be predetermined within a narrow range. It is advantageous if, during the brake-state determination braking, a separate activation of each individual wheel brake takes place, so that the brake state can be determined in each case for an individual wheel.

The method according to the invention may be carried out in conjunction with component-care braking which takes place in any case, so that the outlay in terms of the activation of the brakes is reduced. Component-care braking takes place by system control, without the driver's intervention (that is, without the driver's inducing it in an active way) and, as far as possible, without the driver's noticing it either. Such braking is carried out, for example, for the removal of rust, salt or moisture from the brake disc.

In a refinement of the method, a determination of the brake state takes place only when predeterminable limiting conditions are satisfied, so that a reliable determination of the brake state can be made and/or injury to the driver can be prevented. A predetermined limiting condition may be, for example, a minimum and/or maximum speed of the vehicle and/or a minimum and/or maximum temperature of the vehicle brake. In a determination of the brake state within the framework of a braking operation triggered by the driver, limiting conditions relating to the braking intensity or to the braking duration may be predetermined, in order to ensure a reliable and safe determination of the brake state.

In still another embodiment of the method according to the invention, action on the drive or engine management, brake action or action on the brake-force distribution and/or driver warning is initiated, based on the determined brake state of a motor vehicle brake.

An increase in the comfort for the driver of a vehicle is achieved when, by means of the determined brake state, an adaptation of the brake-pedal characteristic is carried out (that is, the ratio between pedal pressure and brake pressure is adapted to the determined brake state). An adaptation of the brake-pedal characteristic may, for example, take into account the fact that the coefficient of friction between brake disc and brake lining is temperature-dependent.

Other objects, advantages and novel features of the present invention will become apparent from the following detailed description of the invention when considered in conjunction with the accompanying drawings.

DETAILED DESCRIPTION OF THE DRAWINGS

Figure 1:
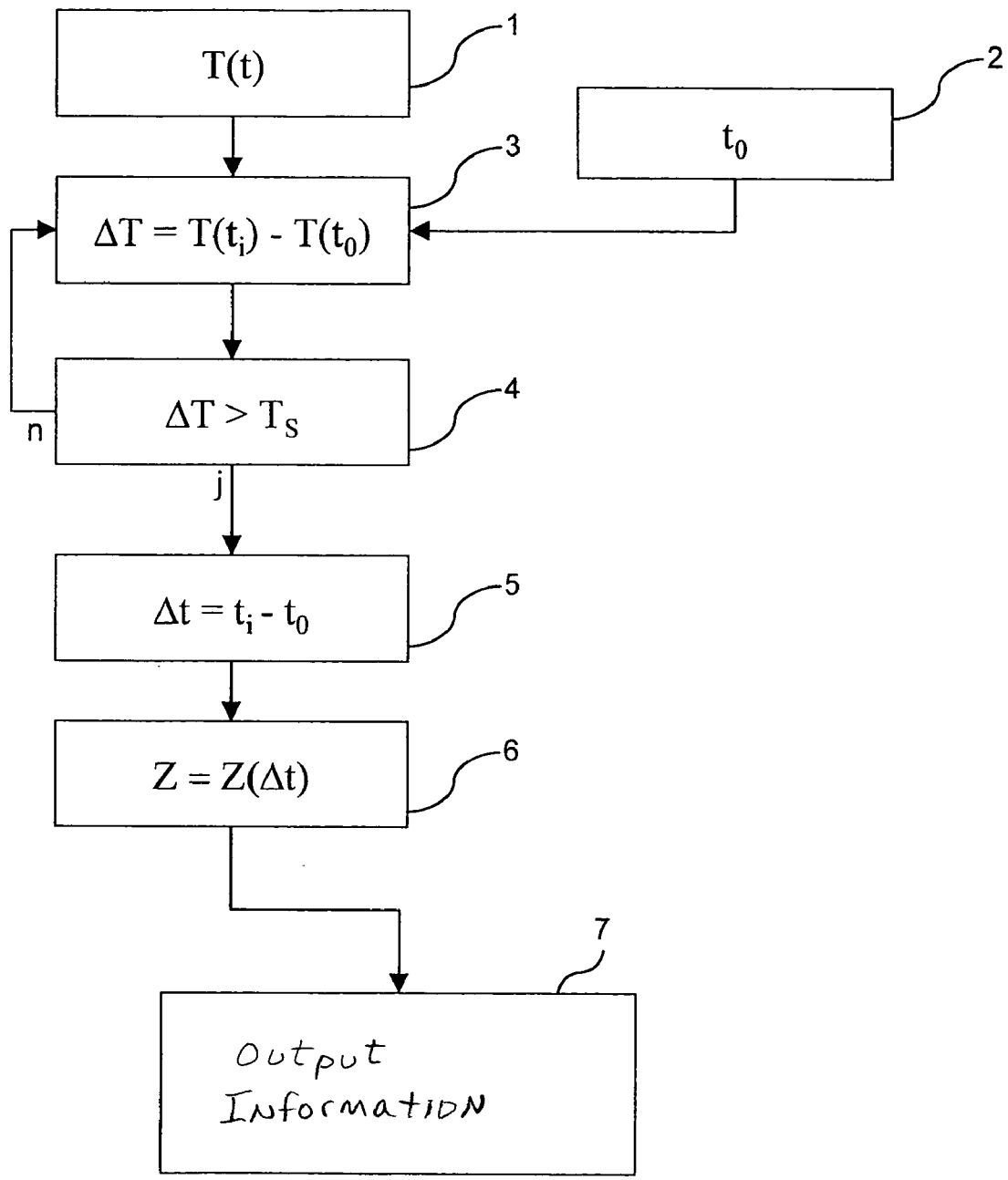
FIGS. 1 and 2 are flow charts that illustrate embodiments of the method according to the invention.

Referring to FIG. 1, in step 1, the temperature is detected continuously or in discrete steps by means of a temperature sensor arranged in or on a brake block. The brake block comprises the brake lining and the usually metallic carrier plate carrying the brake lining. Preferably, the temperature sensor is arranged in a region of the brake lining which faces away from the brake disc (that is, in a region which is near the carrier plate of the brake lining). The temperatures T detected by the temperature sensor are in each case assigned a detection time point t.

A step 2, proceeding preferably in parallel with step 1, monitors whether a predeterminable event, for example a braking operation triggered by the driver or by a control device, is initiated. The starting time point t0 of such a braking operation is noted and, in the embodiment of the invention according to FIG. 1, serves as a reference time point.

In step 3, the difference between a temperature value $T(t_i)$ detected at a predeterminable time point $t_i > t_0$ and a temperature value $T(t_0)$ detected at the time point $t_0$ is calculated. In step 4, if the difference value $\Delta T$ is lower than or equal to the threshold value $T_s$, the process returns to step 3, and a new temperature value $T(t_{i+1})$ detected at a later time point $t^{i+1}$ is employed in order to carry out method steps 3 and 4. This may be repeated until a predeterminable condition, for example a time duration $t_{discon}$, has been exceeded $(t_{i+1} > t_{discon})$. The method is also discontinued and/or restarted when a new braking operation is initiated.

Within the framework in which the method is carried out, after the temperature has been detected in step 1, one or more temperature values T(t) are stored for subsequent use in the method, in particular for use in step 3. Preferably, a plurality of temperature values $T(t_i)$ from a predeterminable detection period $t_{start} < t_i < t_{end}$ or a detected temperature curve T(t) with $t_{start} < t < t_{end}$ are stored and/or further processed.

If, in the comparison in step 4, the temperature difference $\Delta T$ is greater than the threshold value $T_s$, the time difference $\Delta t$ between the time points $t_i$ and to is calculated in step 5.

In step 6, the brake state is determined from the time difference $\Delta t$ thus determined. The time difference $\Delta t$ corresponds to a propagation time of heat generated as a result of the friction of the brake lining with the brake disc. Some of this heat spreads out from the frictional surface of the brake lining and thus passes through the brake lining as far as the temperature sensor. Since the heat propagation time is characteristic of the brake-lining state, particularly the lining thickness of the brake lining, the brake state Z can be determined as a function of the heat transition time $\Delta t$ by means of a functional relation, a table or another assignment instruction.

In a particularly simple embodiment, the brake-lining thickness is determined solely by means of the heat propagation time $\Delta t$. In a more complicated embodiment, further parameters, such as, for example, the initial and/or final temperature in the case of a braking operation, the heat generated during braking or the consumed kinetic energy, the braking duration, the brake pressure, the vehicle speed, the outside temperature or the road moisture, are employed.

In step 7, the brake-lining state information is output, for example, to a driver's information or warning device and/or to a drive-dynamic control device and/or to a brake control system and/or an engine and drive-train control system. The driver can thus be informed of the brake state, especially reduced braking capacity, a critical brake temperature, or a determined brake-lining thickness or remaining brake-lining running distance. The brake control can also be carried out in such a way that the state of wear of all the brake linings is as far as possible equalized; and/or brake control and engine control can take place in such a way that the temperatures of the brake linings are as far as possible equal and/or as low as possible and/or a predeterminable temperature is not exceeded. Moreover, by means of the brake-lining temperature, the coefficient of friction between brake lining and brake disc can be determined and can be taken into account in the conversion of the brake-pedal actuation into braking capacity (that is, in the control of the brake pressure as a function of the pedal force), in order to make it possible to have a uniform pedal sensation independent of the brake state.

Too high a residual torque on the brake (that is, too high a residual braking action without any existing intervention on the brake) can also be determined by means of the method according to the invention. In order to reduce such a residual braking torque, component-care braking can be initiated, which, for example, brings about a desired ventilation play between brake lining and brake disc.

Figure 2:
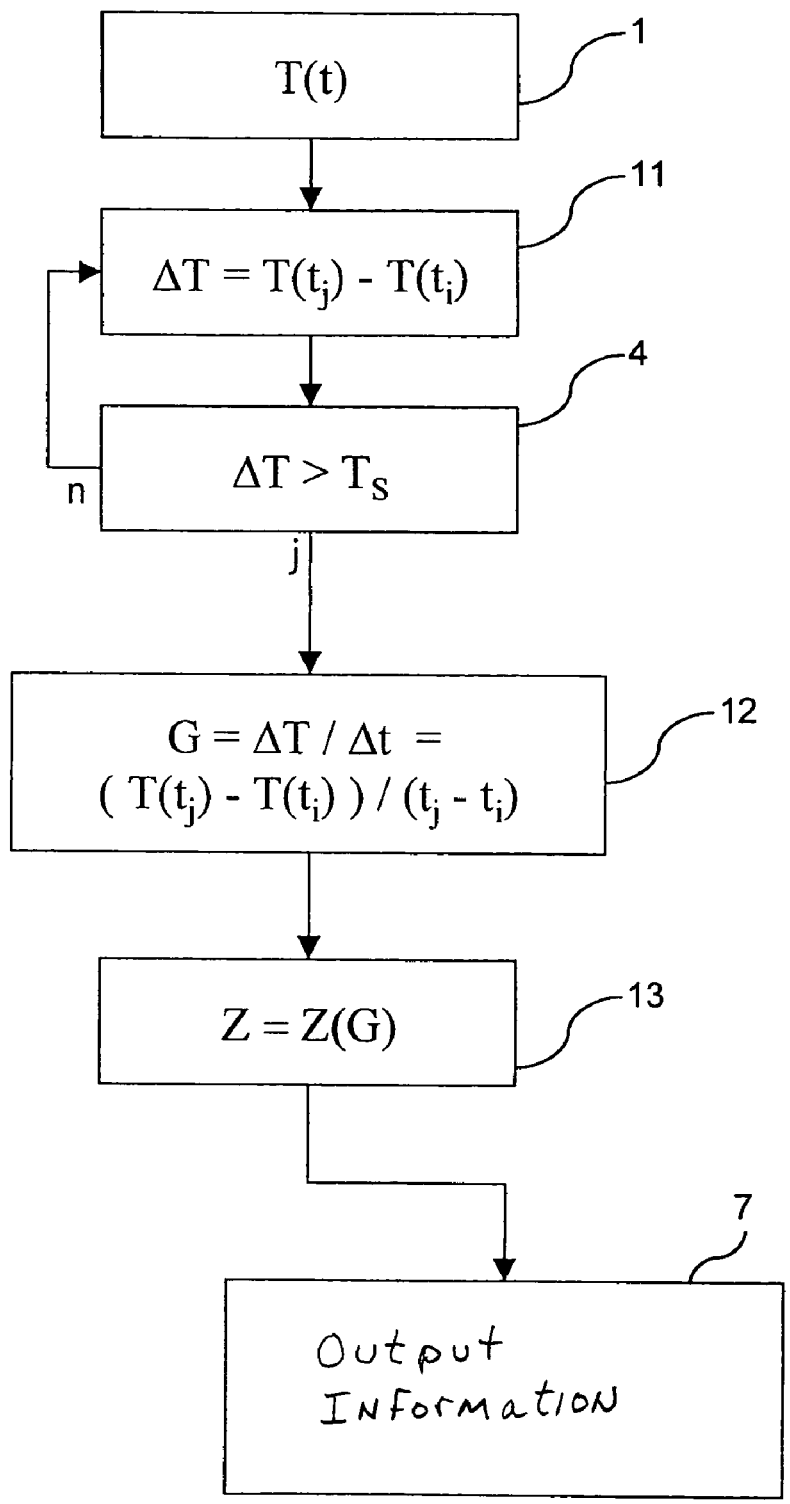

FIG. 2 illustrates a further advantageous embodiment of the invention. As described in connection with FIG. 1, in step 1, the temperature in or on a brake block is detected and is assigned a detection time. Continuously, or triggered by a braking operation, in step 11, the difference between a temperature value detected at the time point $t_i$ and a temperature value detected at the time point $t_j$ is calculated. For this purpose, the time point $t_j$ can be predetermined as a function of the time point $t_i$. If the difference value $\Delta T$ between the temperatures $T(t_{i=1})$ and $T(t_{j=2})$ associated with the times $t_{i=1}$ and $t_{j=2}$ is lower than or equal to a threshold value $T_s$, the process branches back to step 11, and a new temperature value $T(t_{i=3})$ associated with a new time point and/or a new temperature value $T(t_{j=4})$ associated with a new time point is employed in order to carry out the method step 11. The temperature values $T(t_i)$ and the times $t_i$ are determined according to a predeterminable rule. For example, the time value $t_{j=4}$ is determined by means of the time value $t_{i=3}$ and the times $t_{j=2}$ employed in the previous interrogation.

Steps 11 and 4 may be repeated until a predeterminable discontinuation condition is fulfilled. An interrogation of the discontinuation condition and an escape from the method is, as in FIG. 1, not illustrated in FIG. 2, but may be provided at various points, for example between steps 1 and 11, 11 and 4 or 12 and 13.

If the difference value $\Delta T$ between the temperatures $T(t_i)$ and $T(t_j)$ associated with the times $t_i$ and $t_j$ is greater than the threshold value $T_s$, in step 4, the process progresses to step 12, the gradient G of the temperature profile with respect to time is determined. This is carried out, in the simplest case, for example, by means of a difference quotient. In step 13, the brake state Z is determined from the gradient G by means of an assignment instruction, for example a functional relation Z(G), or by means of a table. This state Z, in turn, is indicated, where appropriate, to the driver in step 7.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining the state of a motor vehicle brake having a temperature sensor arranged in or on a brake lining, said method comprising:
   said temperature sensor detecting a first temperature value;
   said temperature sensor detecting at least one second temperature value after the first temperature value;
   determining a time duration between detection time points of said first and said at least one second temperature values; and
   determining said state of said brake, based on a time profile of said temperatures detected by said sensors;
   wherein said first and at least one second temperature values are detected during a brake application for determining a brake-state, which brake application is initiated by a control unit at predeterminable time points or intervals during vehicle operation, without driver intervention.

2. The method according to claim 1, wherein the brake state determined is a brake-lining thickness.

3. The method according to claim 1, wherein:
   a temperature gradient associated with a braking operation is determined from at least the first temperature value, the at least one second temperature value and the time duration between detection of said temperature values; and
   the temperature gradient is used to determine the brake state.

4. The method according to claim 1, wherein during a braking operation, an initial and a final temperature at the temperature sensor are also used to determine the brake state.

5. The method according to claim 1, wherein the determination of the brake state takes place only when predeterminable limitation conditions which allow a reliable determination of the brake state or prevent injury to the driver, are satisfied.

6. The method according to claim 1, wherein, on the basis of the determined brake state of a motor vehicle brake, one of i) action on a drive train or engine management system, ii) brake action and iii) action on brake-force distribution takes place.

7. The method according to claim 1, wherein, one of a driver's warning and an adaptation of a brake-pedal characteristic is performed, based on a determined brake state of a motor vehicle brake.

8. The method according to claim 1, wherein said control unit also controls a drive train of said vehicle during said brake application, in a manner which compensates a braking effect, so that performance of said brake application is substantially unnoticeable to a driver of the vehicle.

9. A method for determining the state of a motor vehicle brake having a temperature sensor arranged in or on a brake lining, said method comprising:

said temperature sensor detecting a first temperature value;

said temperature sensor detecting at least one second temperature value after the first temperature value;

determining a time duration between detection time points of said first and said at least one second temperature values; and determining said state of said brake, based on a time profile of said temperatures detected by said sensors; wherein, a brake application for determining a brake-state is initiated by a control unit at predeterminable time points or intervals during vehicle operation, without driver intervention, the first temperature value is detected at or near commencement of said brake application;

a determination is made whether a temperature difference by which the at least one second temperature value exceeds the first temperature value is greater than a predetermined threshold value;

when said temperature difference is greater than said threshold value, the time duration between the detection of the first temperature value and the at least one second temperature value is employed as a heat propagation time, characteristic of the brake state; and the predetermined threshold value has a magnitude such that it is indicative of a temperature rise that is caused by the braking.

* * * * *